F. J. HEYBACH.
CARTON SETTING-UP MACHINE.
APPLICATION FILED JULY 22, 1910.
1,001,268.
Patented Aug. 22, 1911.
6 SHEETS—SHEET 6.
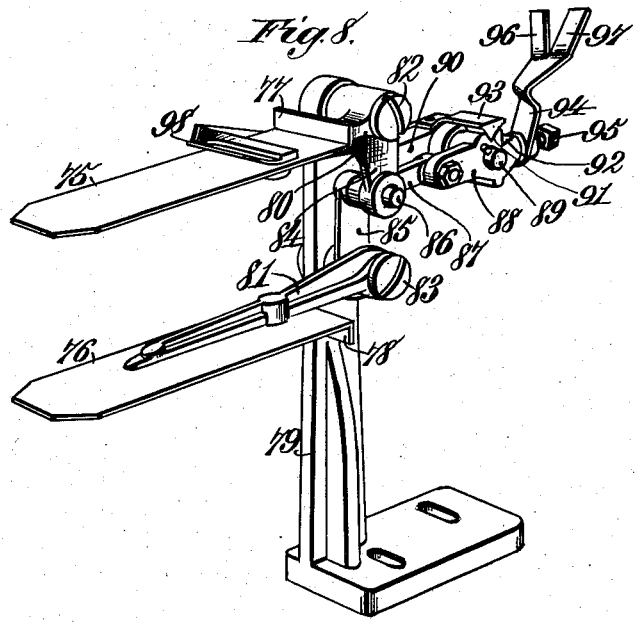
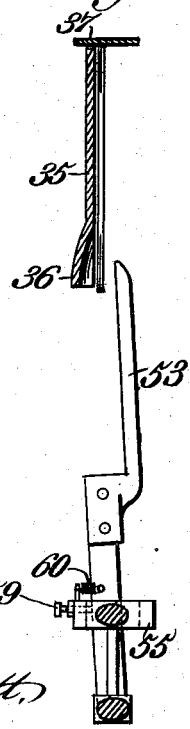
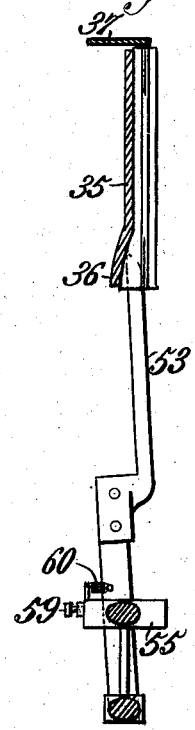
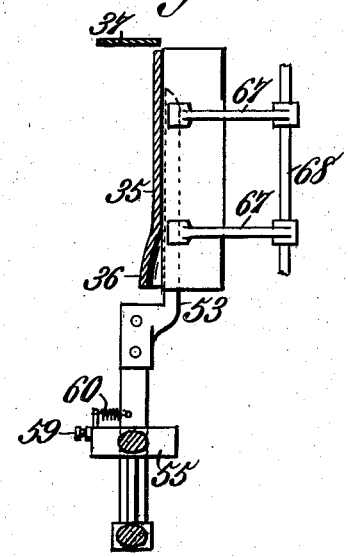
Witnesses.
Inventor.
Frederick J. Heybach,
By

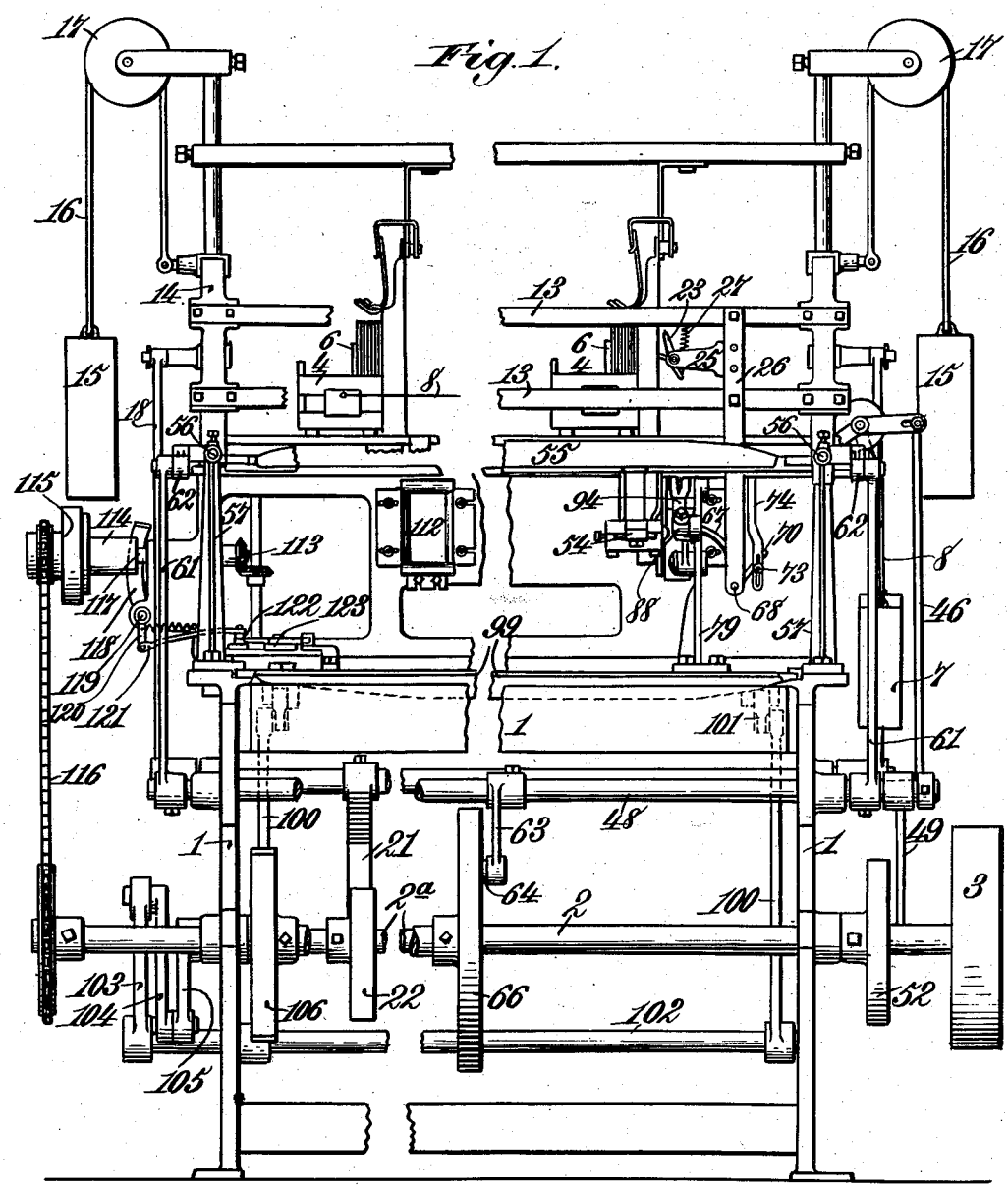

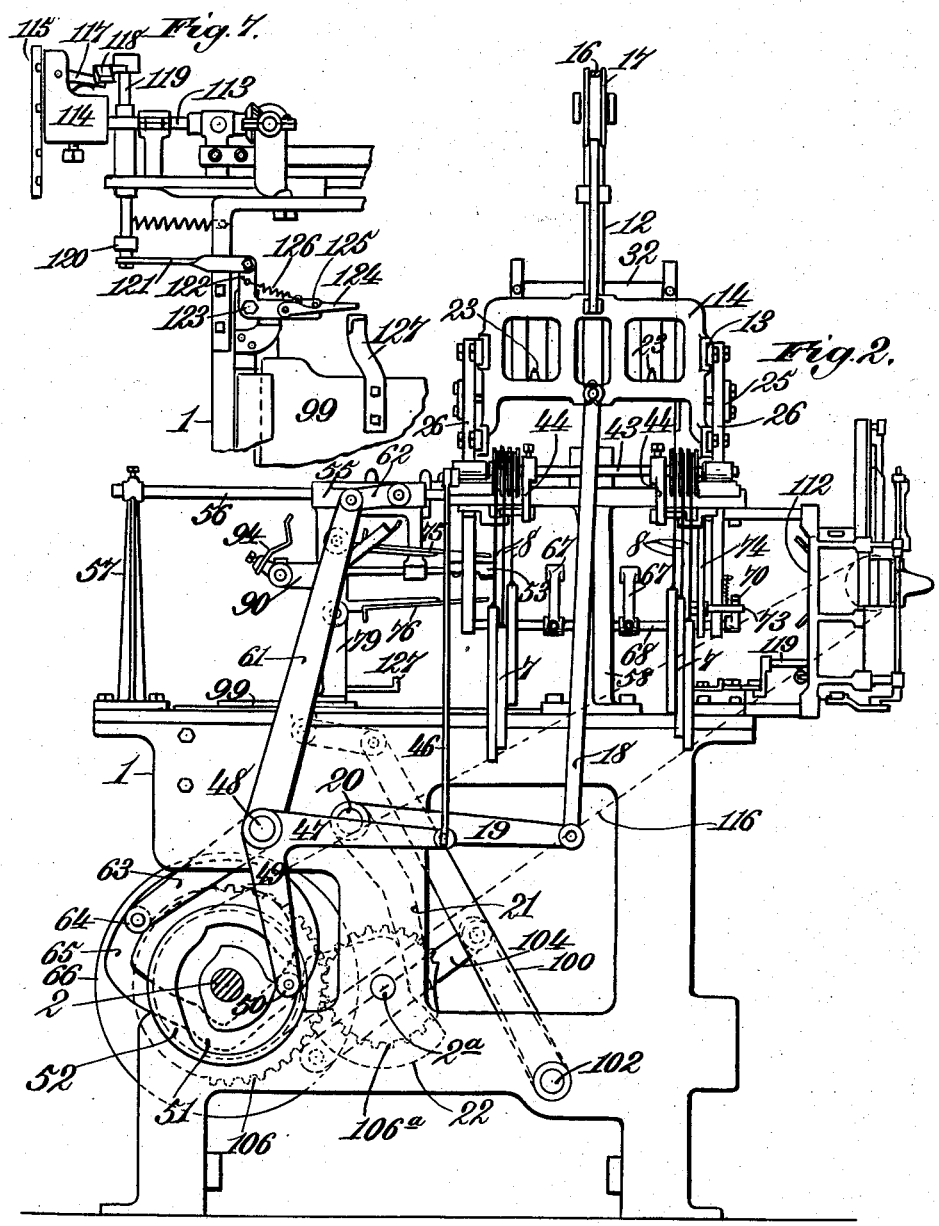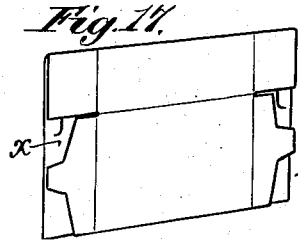

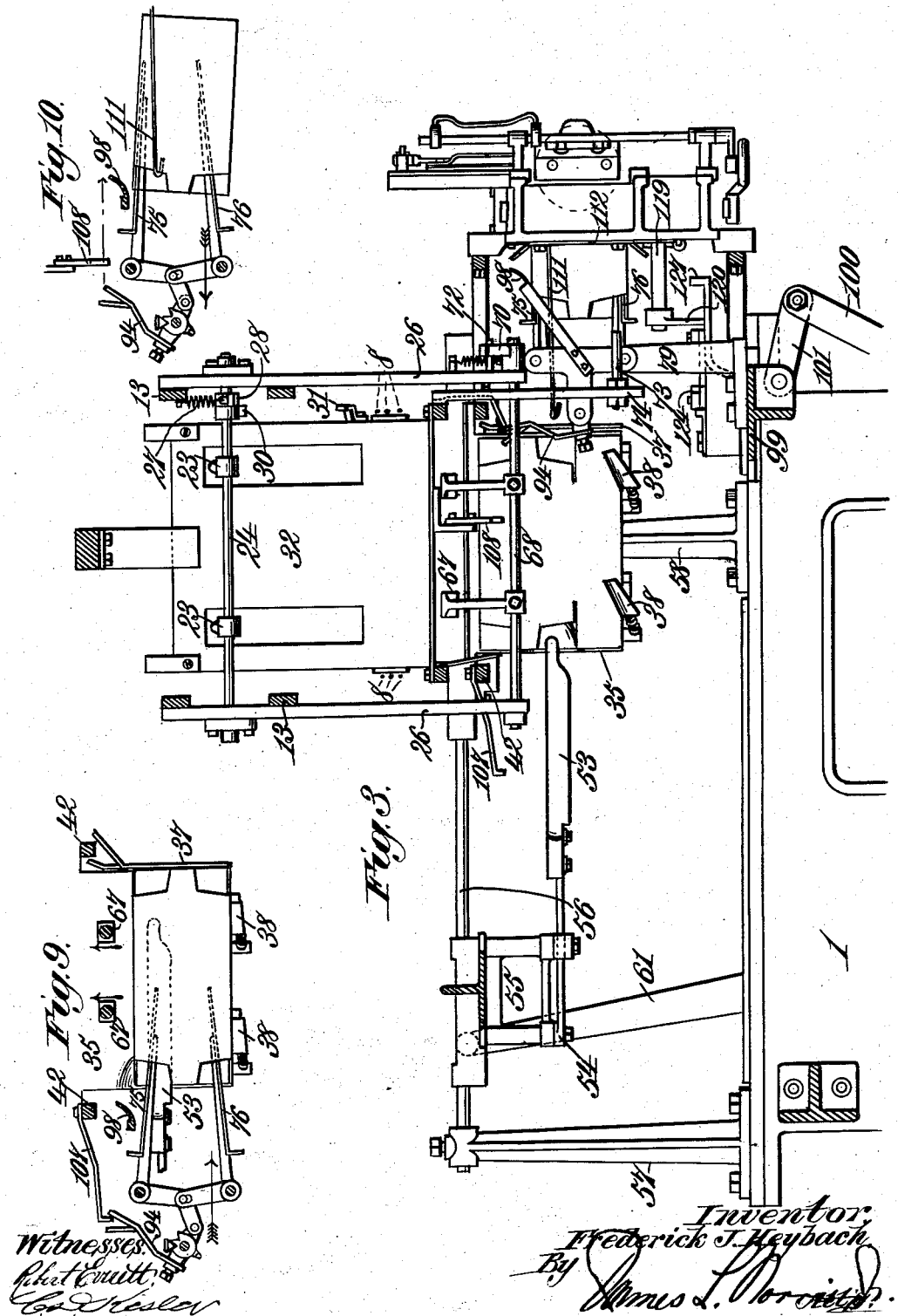

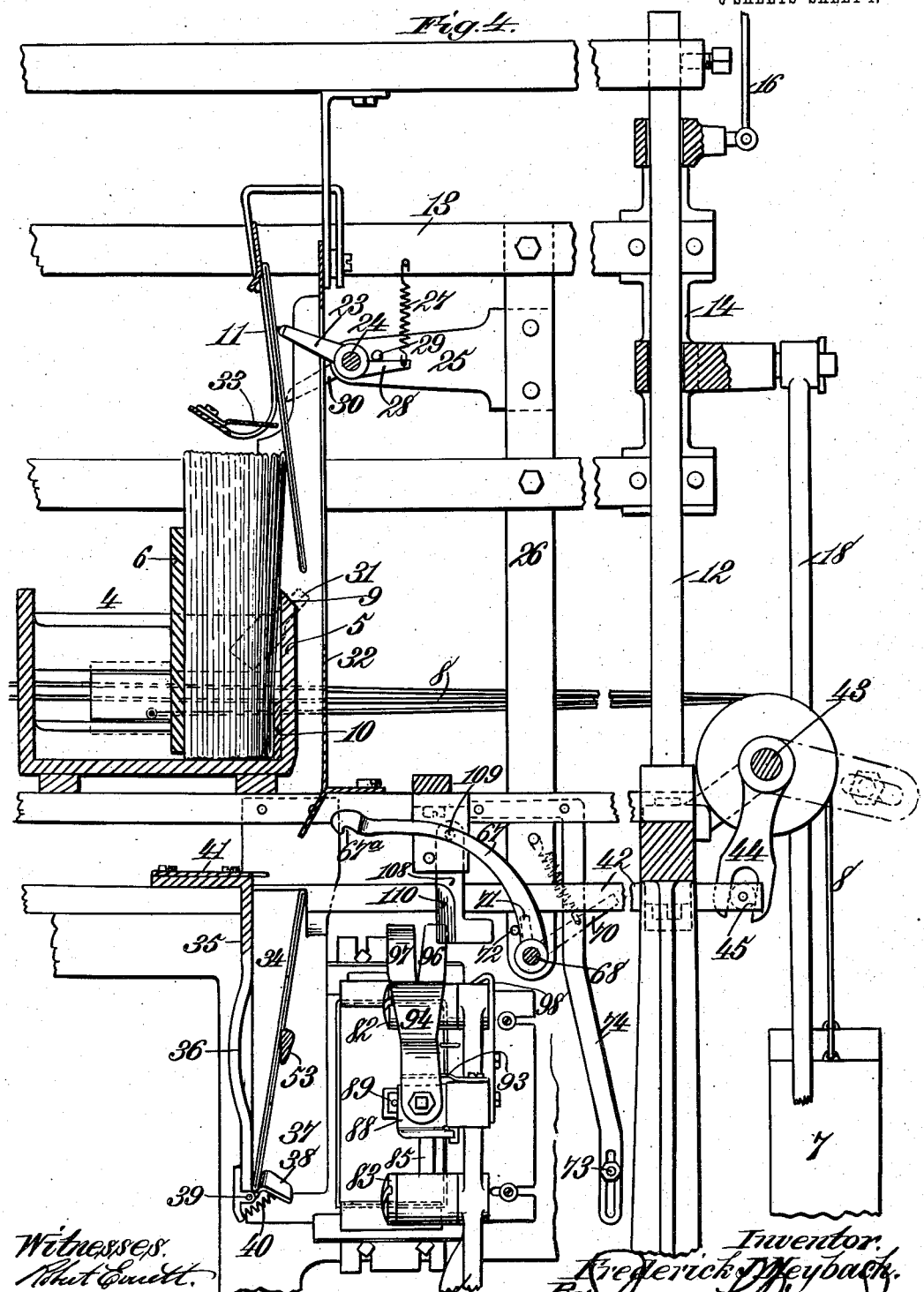

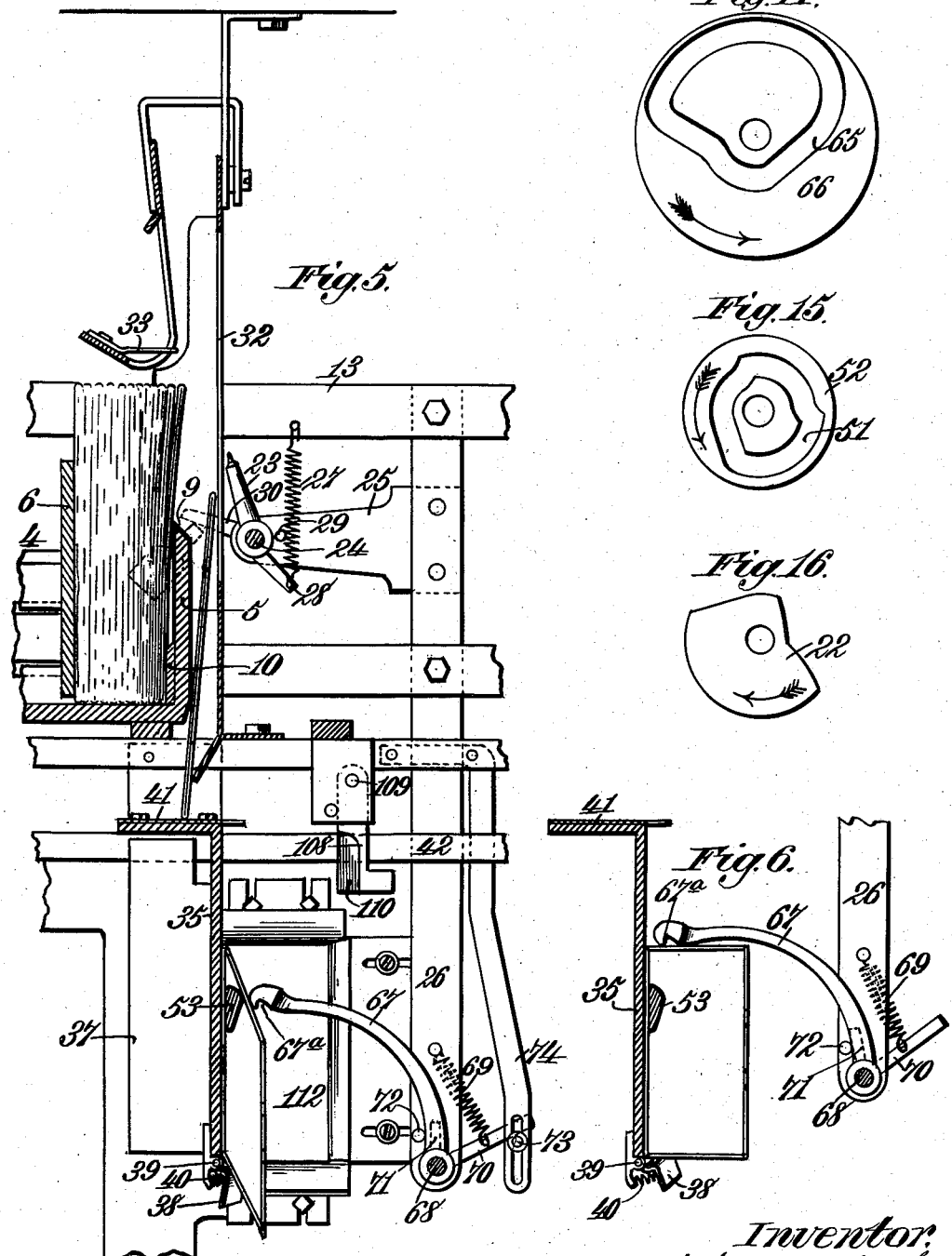

UNITED STATES PATENT OFFICE.

FREDERICK J. HEYBACH, OF BALTIMORE, MARYLAND, ASSIGNOR TO AMERICAN AUTOMATIC MACHINERY COMPANY, OF SAVANNAH, GEORGIA, A CORPORATION OF GEORGIA.

CARTON-SETTING-UP MACHINE.

1,001,268.  Specification of Letters Patent.  Patented Aug. 22, 1911.

Application filed July 22, 1910. Serial No. 573,253.

*To all whom it may concern:*

Be it known that I, FREDERICK J. HEYBACH, a citizen of the United States, residing at Baltimore, State of Maryland, have invented new and useful Improvements in Carton-Setting-Up Machines, of which the following is a specification.

My present invention relates to improvements in machines for opening or setting up cartons and other receptacles from a collapsed condition, and it has for its object to provide an improved machine of this character which is adapted to receive a supply of cartons or receptacles in collapsed condition and is capable of opening them, advancing the opened cartons to a closing mechanism which folds and closes the flaps thereon, and finally ejecting the cartons from the closing mechanism, the various operations upon the cartons being performed automatically and with certainty, and in the preferred embodiments of the invention the machine comprises a plurality of units which are capable of handling a multiple number of cartons at each operation.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a front elevation of a carton setting up and closing machine constructed in accordance with my invention; Fig. 2 represents a side elevation of the machine as viewed from the right in Fig. 1; Fig. 3 represents a detail vertical section of a portion of the machine showing on an enlarged scale the mechanisms for opening the closed cartons and introducing the cartons while opened into the closing mechanism; Fig. 4 represents a vertical section of a portion of the machine showing in detail the mechanism for transferring the collapsed cartons from the supply point to the mechanism which opens them, one of the closed cartons being shown in position preparatory to its delivery to the opening mechanism; Fig. 5 is a view similar to Fig. 4 showing one of the closed cartons in place ready to drop into a position to be received by the opening mechanism and showing the parts of the latter mechanism in the positions they occupy after opening the carton; Fig. 6 is a detail view showing the parts which hold the carton in opened condition preparatory to entering the flap-closing mechanism; Fig. 7 is a detail view of the controlling connection between the carton setting up mechanism and the flap-closing mechanism; Figs. 8, 9 and 10 are detail views of the transferring mechanism which introduces and removes the opened cartons with respect to the flap-closing mechanism; Figs. 11, 12 and 13 are diagrammatic views showing the manner in which the collapsed carton is initially opened; Figs. 14, 15 and 16 are detail diagrammatic views of the cams for operating the different parts of the machine at appropriately timed intervals; and Figs. 17 and 18 represent respectively the collapsed and opened cartons.

Similar parts are designated by the same reference characters in the several views.

In the accompanying drawing, I have shown one embodiment of the invention and in that instance the machine is adapted to handle paper or other cartons of the type having flaps for closing their ends. It will be understood, however, that the invention is not limited to the precise details and relative arrangement of the parts as shown in the drawing, and it will also be understood that the invention is not necessarily limited in practice to the handling of cartons of the particular type above mentioned, as it may be found in practice that the machine is capable of opening or setting up receptacles of other types and for this reason I shall use the term "carton" as including generically all receptacles which the machine is capable of successfully handling.

In the present instance, the machine comprises a suitable frame 1 which may serve as a support for the various parts or mechanisms of the machine, the frame supporting a suitable power shaft 2 which may be revolved continuously by a pulley 3 or equivalent power-transmitting means. The cartons according to the present embodiment of the invention are formed from blanks of cardboard or other suitable material and they are supplied to the machine in substantially the form shown in Fig. 17, that is to say, the cartons are collapsed. The machine is provided with a carton supply receptacle 4, one of these receptacles being preferably provided for each opening and flap-closing unit of the machine. Each receptacle is provided with means for holding a stack or plurality of the collapsed cartons against the front wall 5 of the receptacle, a follower 6 being provided for each receptacle in the present instance which presses against the stack of cartons and serves to advance the stack under the influence of a suitable number of weights 7 which may be operatively connected to the follower by cords or cables 8. The upper edge of the front wall 5 of the supply receptacle is preferably beveled at 9 so as to prevent any of the cartons from lodging thereon while passing to the opening or expanding mechanism, and the rear face of the front wall 5 is preferably provided with an abutment 10 against which the foremost carton in the stack engages at its lower end, the upper end of the foremost carton in the stack being thereby tilted forward so that its lower end will clear the front wall 5 of the receptacle after the carton has been removed from the supply receptacle, as will hereinafter appear. A guard 11 is mounted above the delivery point of the supply receptacle and coöperates as an abutment with a device which serves to remove the collapsed cartons, one at a time, from the supply receptacle and deliver them to a point to be received by the opening or expanding mechanism. In the present instance the frame of the machine is provided with a suitable number of uprights or guides 12 and these uprights or guides support a cross head or frame 13 which is provided at its ends with suitable heads 14 which slide vertically on the guides. The cross head or frame 13 is preferably counterbalanced by means of weights 15 which are connected to cords 16, the latter passing over idler wheels or pulleys 17 and are attached to the cross head or frame 13 as shown in Fig. 1. The cross head or frame 13 is also reciprocated vertically at appropriately timed intervals by means of a pair of connecting rods 18 which are pivotally connected to the cross head or frame at their upper ends and their lower ends are connected to a pair of levers 19, these levers being fixed to a rock shaft 20 suitably journaled in the main frame of the machine, and this rock shaft 20 is provided with an actuating arm 21 which coöperates with a cam 22 connected to the shaft 2$^a$. The cross head or frame 13 is provided, for each unit of the machine, with a carton-feeding device, each of these devices in the present instance consisting of a suitable number of fingers 23 the ends of which are pointed as shown, and these fingers are mounted on a rock shaft 24. This rock shaft may be journaled in a suitable bracket 25 carried by a vertical bar 26 on the cross head or frame 13, and the fingers 23 are normally held yieldably in operative position by means of a tension spring 27 which coöperates with an arm 28 attached to the rock shaft, a stop 29 coöperating with the arm 28 and serving to retain the fingers 23 in normal operative position. The rock shaft 24 is also provided with a releasing finger 30 which is adapted to engage a releasing projection 31 which may be arranged in a stationary position adjacent to the supply receptacle for the cartons. In order to properly direct the cartons into the opening or expanding mechanism after they have been delivered from the supply receptacle, a guard plate 32 may be mounted in front of the receptacle and the fingers 23 may operate in suitable vertical slots in the guard plate. In order to insure removal of but one carton form from the receptacle at each operation, a finger 33 is preferably provided at a point just above the tops of the carton forms composing the stack.

Beneath the delivery point of the supply receptacle for each unit of the machine there is provided a chamber 34 to receive one at a time the carton forms as they are delivered from the supply receptacle. This chamber is provided with a rear plate 35 having a bend or offset 36 formed therein at one of its vertical edges and it also has an end wall 37 which, however, is stationary, and the bottom of the chamber is provided with a pair of ledges 38, the latter being pivoted at 39 to the rear wall 15 and are normally held in elevated position by springs 40. The top of the plate 35 is provided with a controlling plate 41 which serves as a stop to receive and arrest the descent of a folded carton while the plate 35 is in advanced position during the opening of the preceding carton. The plate 35, together with the ledges 38 and the controlling plate 41, is mounted to reciprocate, these parts in the present instance being supported on a frame 42 which frame is suitably guided to reciprocate upon the main frame of the machine and it may serve as a common operating means for the follower plates 35 of all the units of the machine. Any suitable means may be employed for imparting reciprocatory movements to the frame 42 at appropriately timed intervals, a rock shaft 43 being provided in the present instance having an arm 44 which coöperates with a roller or projection 45 on one end of the frame 42, and the rock shaft 43 is operated by a rod or pitman 46, the lower end of this rod or pitman being connected to an arm 47 of a bell-crank lever which is journaled on a shaft or axis 48, the other arm 49 of this bell-crank lever being provided with a roller or projection 50 which follows a cam track or race 51 formed in a cam 52, the latter being fixed upon the shaft 2.

For each unit of the machine there is provided a blade which is introduced at the appropriate moment between the opposite sides of a folded carton and serves to initially open it. In the present instance, I provide a blade 53 for each unit, the forward end of which is tapered or pointed to facilitate its entrance between the sides of the folded carton, and each of these blades is pivoted at its rear end 54 to a cross head 55, this cross head being common to the carton-opening blades of the several units and it is mounted to reciprocate on suitable horizontal guides 56, these guides being supported on suitable brackets 57 and 58 secured in fixed position upon the main frame. Each carton-opening blade 53 is capable of a limited lateral movement, an adjustable stop 59 being secured to the cross head 55 so as to coöperate with and thereby limit the movement of the blade in a direction toward the follower plate 35, and a spring 60 tends to yieldably retain the blade in engagement with the stop 59, this spring, however, permitting the blade to be deflected during an advancing movement of the plate 35. When the cross head 55 is retracted, the tip or point of each blade 53 is arranged substantially in line with the bowed or offset portion 36 of the corresponding plate 35. The cross head 55 may be reciprocated at appropriately timed intervals by any suitable means, it being actuated in the present instance by a pair of arms 61, the upper ends of which are connected to the opposite ends of the cross head by means of links 62, and these arms are fixed at their lower ends upon the shaft 48, the latter being suitably journaled in the main stationary frame of the machine and it is provided with an arm 63 which has a roller or projection 64 that coöperates with a cam track or race 65 formed in a cam 66, the latter being fixed to the shaft 2.

Each blade 53 serves to initially open the folded carton, and the carton is completely opened in such a way as to enable it to maintain a rectangular form by a pair of arms 67 which are fixed to a rock shaft 68, and this rock shaft is journaled in the lower ends of the vertical bars 26 which are carried by the vertically movable frame or cross head 13, the arms 67 consequently rising and falling simultaneously with the corresponding vertical movements of said frame or cross head. These arms 67 are normally and yieldably held in a position to engage the carton and open it by a spring 69 which coöperates with an arm 70 fixed to the shaft 68, a projection 71 being also fixed to the shaft 68 and coöperating with a stud or projection 72 on one of the vertical bars 26, the projections 71 and 72 being normally in engagement under the action of the spring 69. During the descent of the cross head 13, the arms 67 are caused to operate upon the carton in such a way as to open it completely and to also act upon the carton in such a way as to fold it beyond a rectangular form in order that there will be no tendency of the carton to return to its original folded condition. In performing this latter function, the arms 67 preferably exert a suitable pressure upon the carton. To effect this result, I provide an abutment 73 which is arranged in the path of the arm 70, this abutment 73 being supported by a depending arm or bracket 74 attached to a stationary part of the machine frame and when the arm 70 meets the abutment 73 during the descent of the cross head 13, a further descent of the cross head will cause the arms 67 to remain firmly in engagement with the carton and under some pressure. The ascent of the cross head 13 carries the arms 67 upwardly and the carton is permitted to assume a correct rectangular form as shown in Fig. 6, the arms 67 retaining the carton in such form until it has been engaged upon the device which introduces it into the flap-closing mechanism.

Each unit of the machine is provided with a device which automatically receives the carton while it is held by the arms 67 in correct rectangular form and introduces it into the mechanism for closing the flaps thereon. Each of these devices in the present instance embodies a pair of opposed blades 75 and 76 which are preferably flat as shown in Fig. 8 and their rear ends are preferably upturned to form abutment flanges 77 and 78, these flanges serving to properly position the carton upon the transferring device. These blades are pivotally mounted upon an upright or standard 79, they being attached in the present instance to brackets 80 and 81, and these brackets are pivotally connected to the standard 79 by pivot screws 82 and 83. According to the present invention, simultaneous movement is imparted to the opposed blades whereby they may grip and release a carton and for this purpose the brackets 80 and 81 are provided with arms 84 and 85, these arms being operatively connected by a pin or stud 86 which may be attached to one of the arms and may have a sufficiently loose engagement with the other arm as shown, and movement is imparted to the pin 86 by a link 87 which is connected to the pin at one end and is attached at its opposite end to a rocker 88. This rocker is mounted on a shaft 89 supported by an arm 90 forming a rigid part of the standard 79 and the rocker is provided with means whereby it may yieldably retain the blades 75 and 76 either in a position to grip or to release a carton. In the present instance, the rocker is provided with a pair of notches 91 and 92 and the arm 90 of the standard supports a spring-actuated dog 93 which is adapted to engage respectively in said notches. The rocker 88 is also provided with means for automatically operating it to collapse or separate the blades 75 and 76, an arm 94 being fixed to the rocker in the present instance by a suitable clamping bolt 95 and the upper end of the arm 94 is split or divided to form a pair of fingers 96 and 97, these fingers being automatically operated upon during the reciprocatory movements of the transferring device to automatically grip and release the cartons, as will hereinafter appear. In order to assist the gripping action of the blades 75 and 76 upon the carton, I preferably provide a clamp 98 which may be rigidly attached in stationary relation to the standard 79 and it is placed immediately adjacent to one of the blades, it being arranged in coöperative relation with the blade 75 in the present instance and when the blades 75 and 76 are separated, the clamp 98 will coöperate with the exterior of the carton while the blade 75 will coöperate with the interior of the carton, a secure grip on the latter being thereby obtained.

During the operation of opening or expanding the carton by the arm 67, the transferring device is in retracted position, but after the carton has been properly opened, the transferring device is advanced so that its blades enter within the opened carton, grip the carton thereon, and a further advancing movement of the transferring device serves to introduce the opened carton into the flap-closing mechanism, and the transferring device also preferably performs the function of a former by remaining within the carton while the flaps upon its end are being closed. Any suitable means may be provided for imparting the necessary movements to the transferring devices of the different units of the machine and at appropriately timed intervals, the standard 79 which supports the transferring device for each unit being mounted in the present instance on a slide 99, and this slide is guided to reciprocate horizontally upon the main stationary frame. The slide 99 is reciprocated by a pair of arms 100, the upper ends of these arms being connected to the slide by links 101, and the lower ends of these arms are fixed to a shaft 102 suitably journaled in the lower portion of the machine frame. The shaft 102 has an arm 103 fixed thereto and this arm 103 is connected by a link or pitman 104 to a crank 105, the latter being fixed to the countershaft 2ª to which the cam 22 is also attached, and the shaft 2ª is intermittently rotated by mutilated gears 106 and 106ª.

In the present instance, the blades 75 and 76 of the transferring device are spread apart or separated so as to grip the opened carton thereon immediately after such blades have entered the opened carton, this being effected by a latch 107 which is fixed to a stationary part of the frame and is arranged to coöperate with the finger 97 attached to the rocker 88. The collapsing or approaching movement of the blades 75 and 76 is accomplished by a second latch 108, the latter being hung freely on a pivot 109 and its forward face is beveled at 110 so that this latch will be deflected laterally so as to permit passage of the finger 96 during the movement of the transferring device which will introduce the opened carton into the flap-closing mechanism and after the finger 96 has passed, this latch 108 will return to a perpendicular position and during the receding or retracting movement of the transferring device, the latch 108 will engage the finger 96 and a collapsing or approaching movement of the blades 75 and 76 will release the grip of the same upon the carton, the ends of which at this time have been folded. The carton may drop from the transferring device after the latter is retracted from the flap-closing mechanism. In order, however, to insure a removal of the carton from the blades 75 and 76, I may provide a hook 111 the end of which will be arranged to engage the rear open edge of the carton and thereby hold the same while the blades 75 and 76 are being withdrawn therefrom, as shown diagrammatically in Fig. 10.

Any suitable mechanism may be provided for closing the flaps upon the ends of the cartons. In the present instance, I have shown the carton setting up mechanism as applied and combined with a carton-closing mechanism of the type embodied in my pending application, Serial No. 474,728 filed January 28, 1909. It will be understood, however, that while the carton setting up mechanism has been successfully used in connection with a flap-closing mechanism of the type embodied in the aforesaid application, the setting up mechanism is not necessarily limited to any particular type of flap-closing mechanism. As the flap-closing mechanism in itself is not claimed in the present application, a general description of it will be sufficient. This flap-closing mechanism is attached to the setting up mechanism in the path of movement of the devices which transfer the opened cartons from the carton-opening means to the flap-closing mechanism, the flap-closing mechanism having a receiver 112 for each unit of the setting up mechanism, and the devices which operate upon the flaps to close them are actuated by a shaft 113 through the medium of a controlling clutch 114, the shaft 113 supporting a continuously revolving driving gear 115 which may be operated by a chain 116 or other suitable means from the shaft 2, and the clutch 114 is provided with a locking dog 117 which is normally held in inoperative condition by a controlling finger 118. This clutch controlling finger is attached to a shaft 119 and this shaft is connected by a crank 120 and link 121 to a bell-crank 122 which is pivoted at 123 to a part of the stationary frame of the machine. The bell-crank 122 is also provided with a latch 124 which is normally held against a stop 125 on the bell-crank by a spring 126. The slide 99 which carries the transferring devices is provided with a tripping arm 127 which operates upon the latch 124 to set the clutch in driving condition and thereby start the operation of the flap-closing mechanism when the transferring devices have introduced the opened cartons into the respective receivers of the flap-closing mechanism. The tripping arm 127 may pass the latch 124 during the advancing movement of the slide 99. During the return movement of the slide, however, the latch 124 may be deflected so as to disengage from the tripping arm 127.

The operation of the machine may be briefly described as follows: The cartons are supplied to the supply receptacle for each unit of the machine while in collapsed condition as shown in Fig. 17 of the drawing, and the weights 7 serve to advance the stack of collapsed cartons to the front of each supply receptacle. During the ascending movement of the cross head or frame 13, the pointed fingers 23 for each unit of the machine engage the foremost collapsed carton in the supply receptacle, the fingers 23 thereby obtaining a grip or hold upon the foremost carton that will be sufficient to lift and remove it from the supply receptacle and onto the guard 11, the finger 23 serving to prevent more than one carton from leaving the supply receptacle at each operation. Owing to the inclination of the guard or plate 11, the lower end of the carton while in elevated position will be swung clear of the upper end of the front 5 of the supply receptacle. During the descending movement of the cross head 13, the fingers 23 and the carton engaged thereby will descend until the arm 30 operatively connected to the fingers 23 encounters the stop 31, the fingers 23 being thereby freed from the collapsed carton and the latter is then free to drop into a position where its lower edge rests upon the plate 41, as shown in Fig. 5. While the collapsed carton is resting upon the plate 41, the reciprocatory frame 42 will occupy a position toward the right as shown in Fig. 5, but upon the return of this reciprocatory frame 42, the plate 41 will move away from beneath the carton which it supports and this carton will then drop into the chamber 34 and rest between the follower plate 35 and the blade 53, the lower edge of the carton resting upon the guards 38 at points immediately adjacent to the bottom of the plate 35. The next operation involves the opening of the collapsed carton. This is effected by a shifting of the frame 42 by the cam 52 a plurality of steps. During the first step, the frame 42 moves from the position shown in Fig. 4 and illustrated diagrammatically in Fig. 11, to the position shown diagrammatically in Fig. 12 whereupon the frame 42 pauses in its movement. This step in the movement of the frame 42 brings the collapsed carton into such a position that the point of the blade 53 will enter the cutaway portion $x$ in the forward side of the collapsed carton, it being understood that the cartons are all introduced into the machine with the tongue flaps presented foremost. The point of the blade 53 will thereby exert a pressure upon the rear half of the collapsed carton and will press it into the bowed or offset portion 36 of the follower plate 35. The frame 42 is then advanced another step by the cam 52 and at substantially the same time the cross head 13 descends to its lowermost position. During these latter movements of the frame 42 and cross head 13, the cross head 55 carrying the blade 53 is also reciprocated toward the right in Fig. 3, this blade being thereby caused to enter between the forward and rear sides of the collapsed carton and the latter is thereby partially opened. The descending movement of the cross head 13 will bring the arms 67 into such a position that the notches 67$^a$ toward their free ends are caused to engage and press upon the uppermost corner of the partially opened carton and as the arms 67 descend, the form of the carton will be substantially inverted or reversed and while the folding of the carton is thus reversed, the yieldably supported guards 38 will be deflected as shown in Fig. 5. While the frame 42 remains in substantially a stationary position, the cross head 13 will begin to rise and it will ascend until the arms 67 rest in a position that will allow the carton to return until it assumes a rectangular form. The blade 53 is then retracted or withdrawn from the opened carton and the transferring device which embodies the blades 75 and 76 is then advanced so that such blades enter the opened carton and grip it. During the advancing movement of the carton-transferring device, the latch 107 operates to spread the blades 75 and 76 so as to securely grip the carton and retain it in opened and rectangular form, and the opened carton in this condition is introduced into the flap-closing mechanism which thereupon closes the flaps upon the foremost end of the carton.

The mechanism for closing the flaps upon the carton is automatically set into operation owing to the engagement of the tripping arm 127 with the latch 124, the latter abutting against the stud or stop 125 and causing the bell-crank 122 to be rocked about its axis 123, and this motion of the bell-crank is transmitted through the link 121 and the crank 120 to the shaft 119, the latter operating upon the clutch controlling arm 118 so as to swing it clear of the clutch finger 117, the latter then engaging the continuously revolving pulley or gear wheel 115 and in this manner the operating shaft 113 for the flap-closing mechanism is set in motion and receives power from the continuously revolving and main shaft 2. One revolution of the shaft 113 serves to complete the closing of the flaps upon the cartons, the clutch controlling arm 118 automatically disengaging the clutch finger 117 after such revolution is completed and in this manner the flap-closing mechanism is automatically interrupted in its operation. Immediately upon the completion of the closing of the flaps upon the cartons, the slide 99 is retracted through the crank 105 on the shaft 106 and the operative connections between this crank and the slide 99. After each carton has been removed from the flap-closing mechanism, its forward edge is engaged by the resilient hook 111 and the latch 108 also operates to collapse the blades 75 and 76, thereby releasing the grip of these blades upon the carton and allowing the blades to be readily withdrawn from the carton. The cycle of operations just described is repeated for each complete operation of the machine and at each complete operation of the machine, a multiple number of cartons are set up and the flaps thereon are closed, the various operations upon the cartons being performed automatically and with certainty.

I claim as my invention:

1. In a machine for setting up cartons, the combination of means for supporting and shifting a carton laterally while in collapsed condition and in a direction transverse to the plane of the collapsed carton, and a device movable in a direction edgewise of the collapsed carton and operative to enter between and initially spread and open the sides thereof.

2. In a machine for setting up collapsed cartons, the combination of a member having means thereon for engaging one edge of a collapsed carton to support it, and means operative upon the opposite edge of the collapsed carton to impart to it a reversely folded form, said means being also operative to permit the carton to assume an open condition.

3. In a machine for setting up cartons, the combination of a movable plate adapted to advance a collapsed carton by shifting it in a flatwise direction transverse to the plane of the collapsed carton, and an opening device movable transversely of the direction of movement of said plate and operative to enter between the collapsed sides of the carton to initially open the carton.

4. In a carton setting up machine, the combination of a movable plate having an offset at one edge and operative to advance a collapsed carton, and a blade reciprocable transversely of the direction of movement of said plate and having a point arranged to bear on one side of the carton in alinement with said offset portion of the plate and operative to enter between the sides of the carton to initially open it.

5. In a carton setting up machine, the combination of a movable member for advancing a collapsed carton in a flatwise direction transverse to the plane thereof, a reciprocatory blade arranged in the path of movement of said member and operative to enter between the sides of the collapsed carton to initially open the carton, and means operative upon the partially opened carton to complete the opening thereof while the carton remains supported on said member.

6. In a carton setting up machine, the combination of a movable member for supporting and advancing a collapsed carton in a direction transverse to the plane of the collapsed carton, a device operative to enter between the sides of the collapsed carton to spread them and partially open the carton, and an arm having a portion operative upon a corner of the partially opened carton to complete the opening thereof while the carton remains supported by said member.

7. In a carton setting up machine, the combination of a member for advancing a collapsed carton, a blade operative to enter between the sides of the carton to spread them and partially open the carton, arms having notches to coöperate with a corner of the partially opened carton, and means for operating said arms to first carry the carton past a fully opened condition and into a reversely folded condition and to subsequently permit the carton to assume a fully open shape.

8. In a carton setting up machine, the combination of means for supporting and shifting flatwise a carton in collapsed condition in a direction transverse to the plane of the collapsed carton, a blade operative to initially and partially open the carton advanced flatwise thereto by said means, means for completely opening the carton and retaining it in such condition while it remains on said supporting means, and a device operative to enter the completely opened carton and remove it from said supporting means.

9. In a carton setting up machine, the combination of a movable member having means for supporting and advancing a collapsed carton in a direction transverse to the plane of the collapsed carton, a blade movable transversely of the direction of movement of said member and yieldable in the direction of movement of said member, said blade being operative to partially open the collapsed carton, and arms also movable transversely of the direction of movement of said member and operative to completely open the carton while supported on said movable member.

10. In a carton setting up machine, the combination of a movable plate having means for supporting a collapsed carton thereon, a blade for partially opening the collapsed carton, an arm movable transversely of the direction of movement of said plate and having means for yieldably pressing them into engagement with the carton to reversely fold the latter, and means for positively pressing said arm into engagement with the carton while in reversely folded condition.

11. In a carton setting up machine, the combination of means for supporting a collapsed carton, a blade operative to initially and partially open the collapsed carton, means for completely opening the carton, a flap-closing mechanism arranged in alinement with the opened carton, and an expansible transferring device operative to enter the opened carton and to transfer it to the flap-closing mechanism.

12. In a carton setting up machine, the combination of means for supporting a carton in collapsed condition, means for partially opening the collapsed carton, means for completely opening the carton, a flap-closing mechanism, and an expansible device for transferring the opened carton to the flap-closing mechanism embodying opposed coöperative pivoted blades adapted to enter within the opened carton and to grip the carton thereon.

13. In a carton setting up machine, the combination of means for opening a collapsed carton, a flap-closing mechanism, a collapsible carton-transferring device operative between the carton-opening means and the flap-closing mechanism embodying opposed pivoted blades, and devices operative to automatically expand the transferring device to grip the carton and for automatically collapsing the transferring device to release the carton as the latter is removed from the flap-closing mechanism.

14. In a carton setting up machine, the combination of means for opening a collapsed carton, mechanism for closing the flaps thereon and mechanism for transferring the cartons from the opening means to the flap-closing mechanism embodying opposed pivoted blades, a latch operative to automatically expand said blades to grip the opened carton preparatory to the removal of the same from the opening means, and a latch automatically operative to collapse said blades after the removal of the carton from the flap-closing mechanism.

15. In a carton setting up machine, a transferring device comprising a pair of pivotally mounted blades operatively connected for simultaneous expanding and collapsing movements, a clamping member coöperative with one of said blades, and a spring latch operative to yieldably retain the blades either in expanded or collapsed condition.

16. In a carton setting up machine, a carton-transferring device embodying a pair of oppositely positioned and pivotally mounted blades adapted to enter and grip a carton thereon, means operatively connecting said blades for effecting simultaneous expanding and collapsing movements thereof, a rocker operatively connected to said means, and a dog coöperative with the rocker to yieldably retain the latter in either of two positions whereby the blades may be held either in expanded or collapsed relation.

17. In a carton setting up machine, a carton-transferring device comprising a pair of pivotally mounted blades capable of relative expanding and collapsing movements and adapted to enter and grip a carton thereon, a relatively fixed gripping device arranged in coöperative relation with one of the clamping blades and adapted to coöperate with the exterior of a carton on said blades, and means operatively connected to both blades for relatively expanding and collapsing them.

18. In a carton setting up machine, the combination of feeding mechanism and carton-opening mechanism, the feeding mechanism embodying a supply receptacle to contain a stack of collapsed cartons, a reciprocatory feeding device operative to engage and remove the foremost carton in the stack when said feeding device moves in one direction, and a stop or abutment coöperative with the feeding device when it moves in an opposite direction to automatically release the feeding device from the carton and to permit the latter to be delivered to the carton-opening mechanism.

19. In a carton setting up machine, the combination of means for successively feeding a carton flatwise in collapsed condition, means operative successively upon the cartons to partially open them while supported on said feeding means, means operative upon the partially opened cartons to completely open them, while each carton remains supported on said feeding means, mechanism for closing the flaps upon the cartons, and a transferring device operative to receive the fully opened cartons from said feeding means and to introduce them into the flap-closing mechanism.

20. In a carton setting up mechanism, the combination of a supply receptacle adapted to contain cartons in collapsed condition, a reciprocatory feeder operative when moved in one direction to remove the collapsed cartons successively from the supply receptacle and operative when moved in an opposite direction to release the cartons, a reciprocatory member mounted beneath the feeder and having means for receiving and supporting the cartons in collapsed condition after delivery from the supply receptacle, a blade operative to partially open the collapsed cartons, means operative to completely open the cartons, mechanism for closing the flaps upon the cartons, a transferring device operative to receive the fully opened cartons and to introduce them into the flap-closing mechanism, and devices for automatically operating the transferring device to grip and release the cartons.

21. The combination of a carton setting up mechanism, clutch-operated mechanism for closing the flaps upon the cartons, and a controlling connection between the carton setting up mechanism and the clutch for the flap-closing mechanism for automatically setting the flap-closing mechanism into operation after the setting up mechanism has completed each operation.

In testimony whereof I have hereunto set my hand in presence of two subscribing witnesses.

FREDERICK J. HEYBACH.

Witnesses:
 Ross V. Craggs,
 Cary D. Hall, Jr.